United States Patent
Kigawa (10) Patent No.: US 10,891,725 B2
(45) Date of Patent: Jan. 12, 2021

(54) INSPECTION APPARATUS AND INSPECTION METHOD

(71) Applicant: NITTO DENKO CORPORATION, Ibaraki (JP)

(72) Inventor: Yoichi Kigawa, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 15/728,905

(22) Filed: Oct. 10, 2017

(65) Prior Publication Data
US 2018/0144461 A1 May 24, 2018

(30) Foreign Application Priority Data
Nov. 21, 2016 (JP) ................. 2016-226037

(51) Int. Cl.
*G06T 7/00* (2017.01)
*G01N 21/88* (2006.01)
(Continued)

(52) U.S. Cl.
CPC ....... *G06T 7/0008* (2013.01); *G01N 21/8851* (2013.01); *G01N 21/95* (2013.01);
(Continued)

(58) Field of Classification Search
CPC ..... G06T 7/0008; G06T 7/0004; G06T 7/001; G06T 2207/10024; G06T 2207/30148;
(Continued)

(56) References Cited

U.S. PATENT DOCUMENTS

| 6,954,678 B1 * | 10/2005 | Phan | H01L 22/26 257/E21.528 |
| 2004/0066386 A1 * | 4/2004 | Leprevost | G06T 15/04 345/582 |

(Continued)

FOREIGN PATENT DOCUMENTS

| JP | 2008-082821 A | 4/2008 |
| JP | 2009-103498 A | 5/2009 |

(Continued)

OTHER PUBLICATIONS

Office Action dated Oct. 2, 2020, issue in counterpart JP application No. 2016-226037 with English translation. (7 pages).

*Primary Examiner* — John W Lee
(74) *Attorney, Agent, or Firm* — Westerman, Hattori, Daniels & Adrian, LLP (57) ABSTRACT

An inspection apparatus configured to inspect a target for defects, including: an image capturing unit capable of capturing an image of the target as image information having color information including RGB values; and a determination unit configured to determine presence or absence of defects in the target based on the color information of the image information of the image captured by the image capturing unit, wherein the determination unit is configured to define, for each pixel, criteria for determining presence or absence of defects in each pixel of the image information, based on the color information in a defect-free region of the target captured by the image capturing unit, and to filter all pixels in the image information of the image captured by the image capturing unit so as to determine presence or absence of defects in each pixel, based on the defined criteria.

5 Claims, 9 Drawing Sheets

(51) Int. Cl.
*G01N 21/95* (2006.01)
*G01N 21/84* (2006.01)

(52) U.S. Cl.
CPC ............ *G06T 7/001* (2013.01); *G06T 7/0004*
(2013.01); *G01N 21/8422* (2013.01); *G01N 2021/8864* (2013.01); *G06T 2207/10024* (2013.01); *G06T 2207/30148* (2013.01)

(58) Field of Classification Search
CPC ............... G01N 21/95; G01N 21/8851; G01N 2021/8864
See application file for complete search history.

(56) References Cited

U.S. PATENT DOCUMENTS

| | | | |
|---|---|---|---|
| 2008/0075352 A1* | 3/2008 | Shibuya | G06K 9/6254 382/141 |
| 2011/0170783 A1 | 7/2011 | Ono et al. | |
| 2012/0163698 A1* | 6/2012 | Michelsson | G01N 21/9501 382/141 |

FOREIGN PATENT DOCUMENTS

| | | |
|---|---|---|
| JP | 2011-141809 A | 7/2011 |
| JP | 2015-203586 A | 11/2015 |

\* cited by examiner

IMAGE INFORMATION DA (IMAGE INFORMATION KNOWN TO HAVE DEFECT-CONTAINING REGION IN ADVANCE)

CRITERIA ARE DEFINED USING SVM

(1) EXTRACT EACH PIXEL P

1 PIXEL (2) DETERMINE RGB VALUES OF EACH PIXEL

NORMAL ← → DEFECTIVE

CRITERIA (3) CORRELATION VALUE => PIXEL VALUE

CORRELATION VALUE
(NORMAL: 1 TO DEFECTIVE (UNEVENNESS): 0)

PIXEL VALUE = CORRELATION VALUE × 255

(4) PIXEL CONVERSION

Fig. 8

REGION WITH TONES INVESTIGATED

INSPECTION APPARATUS AND INSPECTION METHOD

CROSS-REFERENCE TO RELATED APPLICATION

This application claims priority to Japanese Patent Application No. 2016-226037, filed on Nov. 21, 2016, the disclosure of which is incorporated herein by reference in its entirety.

BACKGROUND OF THE INVENTION

Field of the Invention

The present invention relates to an inspection apparatus and an inspection method.

Background Art

Conventionally, inspection apparatuses have been used for inspecting a target such as a sheet for defects such as unevenness, air bubbles, and foreign matter. As such an inspection apparatus, an inspection apparatus configured to obtain image information for defining defect criteria by capturing an image using a camera or the like as image information including color information, to define the criteria for determining the presence or absence of defects in the region in advance by filtering the obtained image information for defining defect criteria so that the image information for defining criteria is emphasized, and to determine the presence or absence of defects in the image information of a target based on the defined criteria, for example, has been proposed.

For example, an inspection apparatus configured to calculate energy, entropy, and uniformity of the entire obtained image information for defining criteria from the color information including HSV, to define criteria in advance from the energy, entropy, and uniformity, using a support vector machine, and to inspect the target based on the defined criteria has been proposed. This inspection apparatus enables inspection of whether a welded part has a desired shape, for example, in welding of a metal member (see JP 2009-103498 A).

SUMMARY OF THE INVENTION

However, even if such a technique as disclosed in JP 2009-103498 A is used for defect inspection of a target such as a sheet, there may be cases where the defect inspection cannot be performed with sufficiently high accuracy.

In view of the aforementioned circumstances, it is an object of the present invention to provide an inspection apparatus and an inspection method that enable defect inspection with higher accuracy than in conventional techniques.

As a result of diligent studies about means to solve the aforementioned problem, the inventors have achieved the following understanding. That is, the inspection apparatus as disclosed in JP 2009-103498 A needs to define the criteria for determining the presence or absence of defects from the pixel information for defining criteria in a comparatively wide area (pixels). However, they have found that defect inspection cannot be sufficiently performed by the inspection apparatus configured to define the criteria based on the image information for defining criteria in such a wide area and based on the energy, entropy, and uniformity. As a result of further diligent studies based on such an understanding, the inventors have found that the inspection can be performed with sufficiently high accuracy by filtering image information for defining criteria in a defect-free region of the image information of a target per unit of pixel based on color information including RGB values so as to define criteria for determining the presence or absence of defects in the pixel in advance, and determining the presence or absence of defects in all pixels of the image information of the image of the target which is captured by an image capturing unit based on the criteria for each pixel, to accomplish the present invention.

That is, an inspection apparatus according to the present invention is an inspection apparatus configured to inspect a target for defects, the inspection apparatus including: an image capturing unit capable of capturing an image of the target as image information having color information including RGB values; and a determination unit configured to determine presence or absence of defects in the target based on the color information of the image information of the image captured by the image capturing unit, wherein the determination unit is configured to define, for each pixel, criteria for determining presence or absence of defects in each pixel of the image information, based on the color information in a defect-free region of the target, and to filter all pixels in the image information of the image captured by the image capturing unit so as to determine presence or absence of defects in each pixel, based on the defined criteria. Here, R represents red, G represents green, and B represents blue. Further, R is a value with reference to monochromatic light at a wavelength of 700 nm, G is a value with reference to monochromatic light at a wavelength of 546.1 nm, and B is a value with reference to monochromatic light at a wavelength of 435.8 nm.

In the inspection apparatus having the aforementioned configuration, it is preferable that the color information further include HSL values. Here, H represents the hue, S represents the saturation, and L represents the luminance, which are values calculated from the aforementioned RGB by the later-described conversion formula.

In the inspection apparatus having the aforementioned configuration, it is preferable that the color information further include XYZ values. Here, X represents the degree to which a human (eyes) feels red, Y represents the degree to which a human (eyes) feels blue, and Z represents the degree to which a human (eyes) feels green, which are values calculated from the aforementioned RGB by the later-described conversion formula.

In the inspection apparatus having the aforementioned configuration, it is preferable that the determination unit be configured to filter each pixel based on the color information in the defect-free region of the target and further based on the color information in a defect-containing region thereof.

In the inspection apparatus having the aforementioned configuration, it is preferable that the determination unit be configured to define the criteria using a support vector machine.

In the inspection apparatus having the aforementioned configuration, it is preferable that the determination unit be configured to perform the filtering and thereafter further filtering corresponding to shape of defects.

In the inspection apparatus having the aforementioned configuration, it is preferable that the determination unit be configured to map results of determining the presence or absence of defects in each of all pixels in image information of the image captured by the image capturing unit.

An inspection method according to the present invention is a method for inspecting a target for defects using the aforementioned inspection apparatus, the method including: capturing an image of the target as image information including the color information; and determining presence or absence of defects in each of all pixels in image information of the captured image so as to determine presence or absence of defects in the target.

DETAILED DESCRIPTION OF THE PREFERRED EMBODIMENTS

Hereinafter, an inspection apparatus and an inspection method according to embodiments of the present invention will be described with reference to the drawings.

First, the inspection apparatus of this embodiment will be described.

Figure 1:
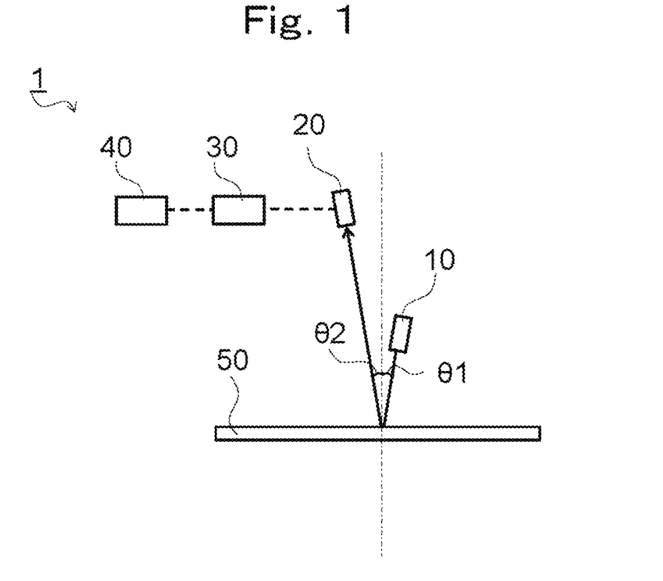
FIG. 1 is a schematic side view showing an inspection apparatus according to an embodiment of the present invention.
Figure 2:
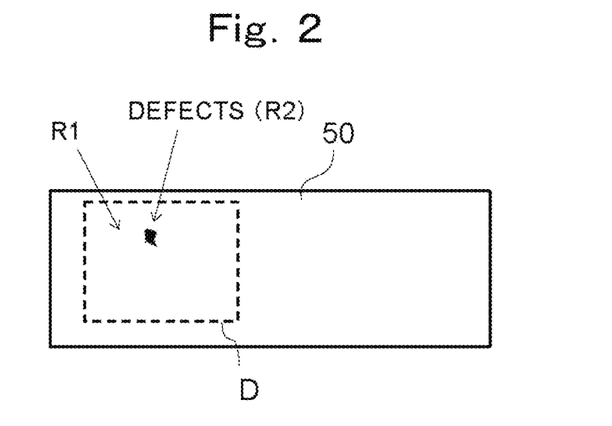
FIG. 2 is a schematic plan view showing the state where a defect is contained in a sheet that is inspected by the inspection apparatus of this embodiment.
Figure 3:
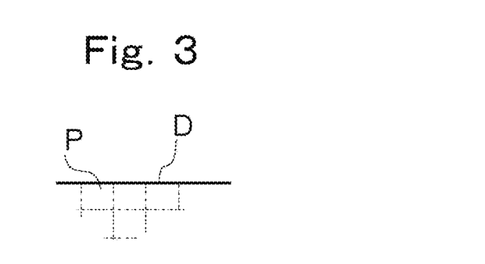
FIG. 3 is a schematic plan view showing pixels included in image information.

As shown in FIG. 1 to FIG. 3, an inspection apparatus 1 of this embodiment which is configured to inspect a sheet 50 as a target for defects includes: an image capturing unit 20 capable of capturing an image of the sheet 50 as image information D having color information including RGB values; and a determination unit 30 configured to determine the presence or absence of defects in the sheet 50 based on the color information of the image information D of the image captured by the image capturing unit 20, wherein the determination unit 30 is configured to define, for each pixel P, criteria T for determining the presence or absence of defects in the pixel P of the image information D by filtering each pixel P, based on the color information of a defect-free region R1 of the sheet 50 (the region of the sheet 50 in FIG. 2 except for the defect), and to filter all pixels P in the image information D of the image captured by the image capturing unit 20 so as to determine the presence or absence of defects in each pixel P, based on the defined criteria T. The inspection apparatus 1 further includes: an irradiation unit 10 configured to emit light onto the sheet 50; and a display unit 40 configured to display determination results by the determination unit 30.

The sheet 50 is not specifically limited. Examples of the sheet 50 include an optical film, a heat shielding film, a heat insulating film, and a UV cut film. Other than these examples, an adhesive tape having a substrate and an adhesive layer laminated onto the substrate also can be mentioned as the sheet 50. Examples of the adhesive tape include an adhesive tape formed by laminating an adhesive layer onto only one side of the aforementioned substrate, and an adhesive tape formed by laminating adhesive layers onto both sides of the aforementioned substrate.

The irradiation unit 10 is configured to emit light onto the sheet 50, so that the light emitted by the irradiation unit 10 onto the sheet 50 and reflected by the sheet 50 (specularly reflected light) is received by the image capturing unit 20. The irradiation unit 10 is not specifically limited as long as it is capable of emitting light that can be received by the image capturing unit 20. Examples of the irradiation unit 10 include white LED that emits white light. An angle $\theta 1$ made by the irradiation unit 10 with respect to a perpendicular direction (the dashed-dotted line in FIG. 1) to the sheet 50 is not specifically limited, as long as the image capturing unit 20 can receive the light emitted from the irradiation unit 10. The angle $\theta 1$ can be set, for example, to 10°. The distance (shortest distance) of the irradiation unit 10 from the sheet 50 is not specifically limited.

The image capturing unit 20 is capable of capturing an image of the sheet 50 as the image information D including color information. In this embodiment, the image capturing unit 20 is configured to capture an image of the sheet 50 by receiving the light emitted from the irradiation unit 10 and reflected by the sheet 50. The image capturing unit 20 is not specifically limited, as long as it can capture an image of the sheet 50 as the image information D having color information including RGB values.

Examples of the image capturing unit 20 include a camera.

An angle $\theta 2$ made by the image capturing unit 20 with respect to the perpendicular direction (the dashed-dotted line in FIG. 1) to the sheet 50 is not specifically limited, as long as the image capturing unit 20 can receive the light emitted from the irradiation unit 10. The angle $\theta 2$ can be set, for example, to 10°. The distance (shortest distance) of the image capturing unit 20 from the sheet 50 is not specifically limited.

The determination unit 30 is configured to define, for each pixel P, the criteria T for determining the presence or absence of defects in the pixel P of the image information D, based on the color information in the defect-free region R1 of the sheet 50, and filter all the pixels P in the image information D of the image captured by the image capturing unit 20 so as to determine the presence or absence of defects in each pixel P, based on the defined criteria T.

Specifically, in this embodiment, the determination unit 30 is configured to filter each pixel P based on the color information in the defect-free region R1 of the sheet 50 and further the color information in a defect-containing region R2 thereof.

More specifically, as shown in FIG. 2, the image capturing unit 20 captures an image of the sheet 50 which is known to contain a defect in advance, so that the image includes the defect-free region R1 and the defect-containing region R2. The image information D of the captured image includes RGB values as color information. The determination unit 30 defines RGB values (reference RGB values) that serve as the criteria for defect determination from the RGB value group (group of RGB values) obtained for each pixel P and the result group (group of results) for defect determination corresponding to the RGB value group. The criteria are defined, for example, using a support vector machine. The criteria are defined, for example, as a group of reference values (reference value group). Further, the criteria correspond to boundaries for defect determination. A conventionally known support vector machine can be used therefor.

Figure 4:
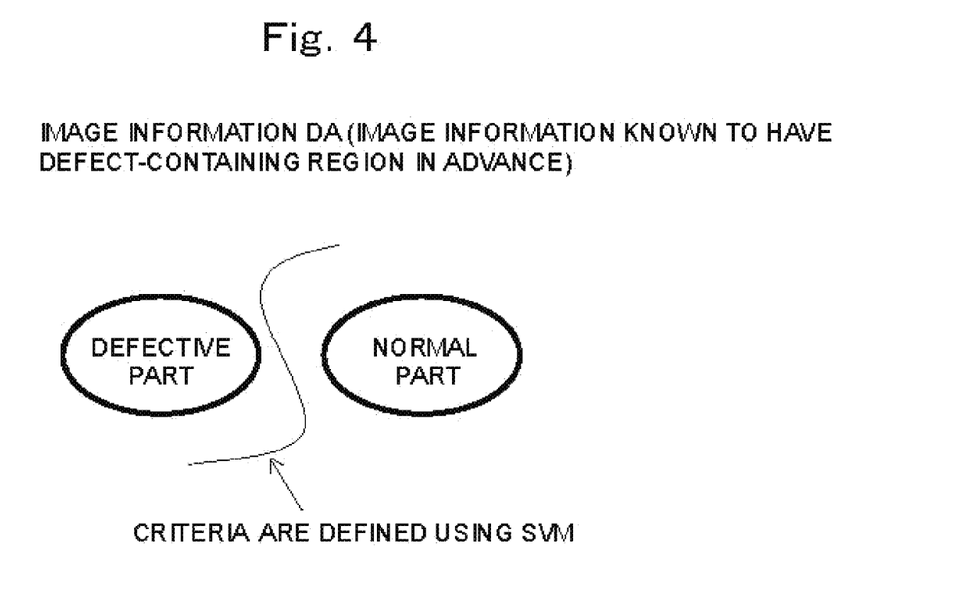
FIG. 4 is a schematic view schematically showing an example of defining criteria by filtering in this embodiment.

Specifically, for example, as shown in FIG. 4, the determination unit 30 associates RGB values of image information which is known to have a defect-containing region in advance, that is, the image information DA in which the presence of defects is known in advance with information on the presence or absence of defects for each pixel P. Subsequently, the aforementioned criteria can be defined from the RGB value group (defective part in FIG. 4) that indicates the presence of defects and the RGB value group (normal part in FIG. 4) that indicates the absence of defects, for example, using a support vector machine as a classifier.

Figure 5:
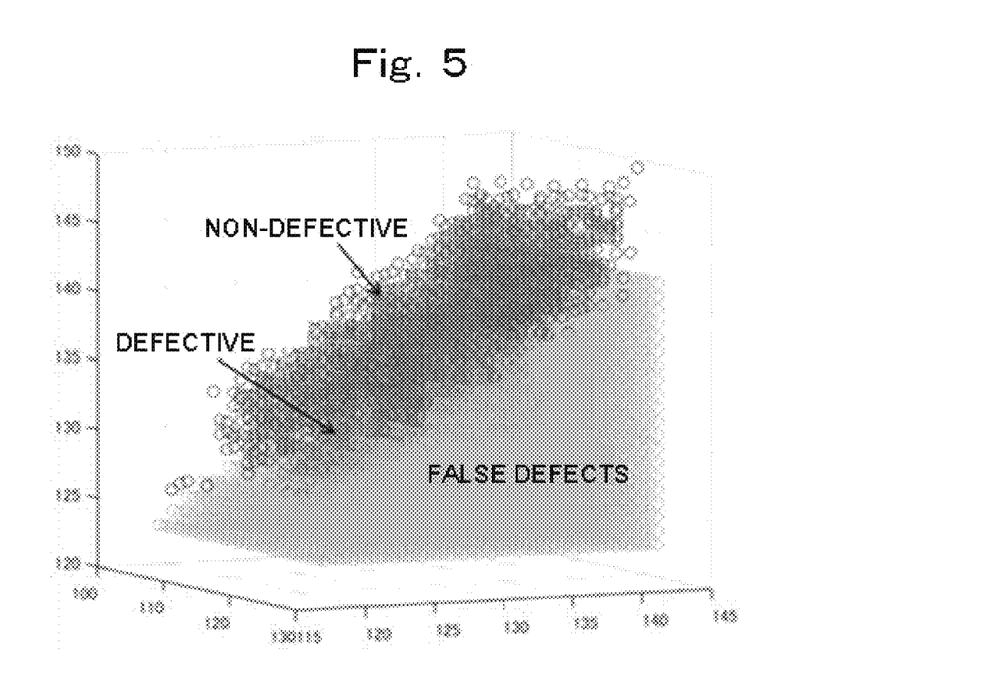
FIG. 5 is a graph showing an example of results of filtering in this embodiment.

The determination unit 30 is configured to define the aforementioned criteria of each of the RGB values, which are R value, G value, and B value, from each value group and a corresponding result group for defect determination of R value, G value, and B value. FIG. 5 shows an example of a graph obtained by plotting the relationship between B value obtained for each pixel P and the result group for defect determination corresponding to the B value.

In this embodiment, the determination unit 30 is configured to define the criteria using a support vector machine since the relationships between the aforementioned RGB value groups and the result groups for defect determination are non-linear.

The determination unit 30 inspects the sheet 50 as an inspection target to determine the presence or absence of defects based on the criteria T defined in advance as described above. Specifically, the determination unit 30 is configured to determine the presence or absence of defects in each pixel P of the image information D of the image of the sheet 50 captured by the image capturing unit 20 for each pixel P by comparing the RGB values of each pixel P respectively with the defined criteria T, and to map the determination results of all the pixels P. For example, the determination unit 30 defines the RGB values of each pixel P in the image information D of the captured image as numerical values between 0 and 1, supposing that the RGB values in the case of the presence of defects are 0, and the RGB values in the case of the absence of defects are 1. The determination unit 30 maps the defined numerical values by multiplying them by 255 for imaging. Subsequently, the determination unit 30 binarizes the created image, or binarizes the created image after being processed using a differential filter, which will be described below, to detect a defective part. Examples of the determination unit 30 include a conventionally known computer. The determination unit 30 stores programs used for various processes. The display unit 40 displays the results mapped by the determination unit 30 as a mapped image.

Figure 6:
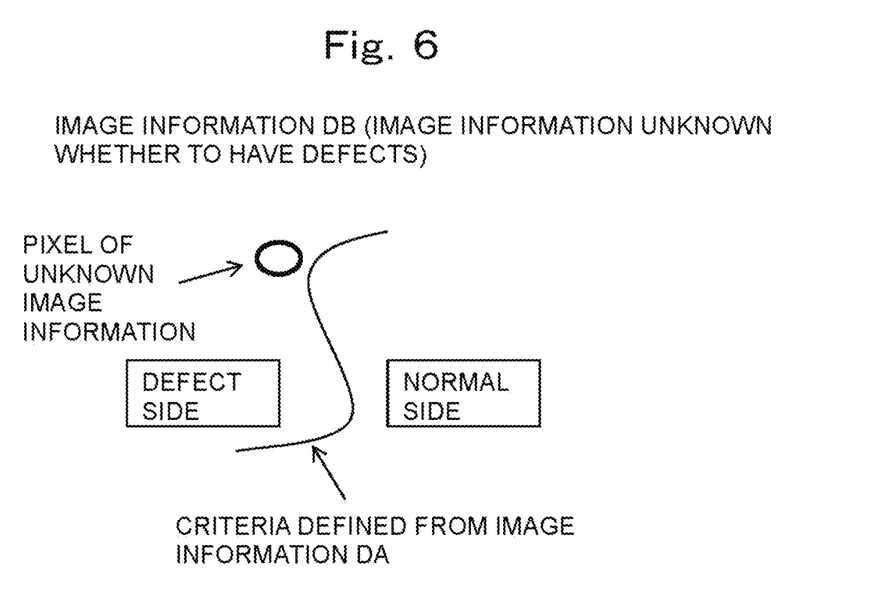
FIG. 6 is a schematic view schematically showing an example of determining the presence or absence of defects in unknown image information by filtering in this embodiment.
Figure 7:
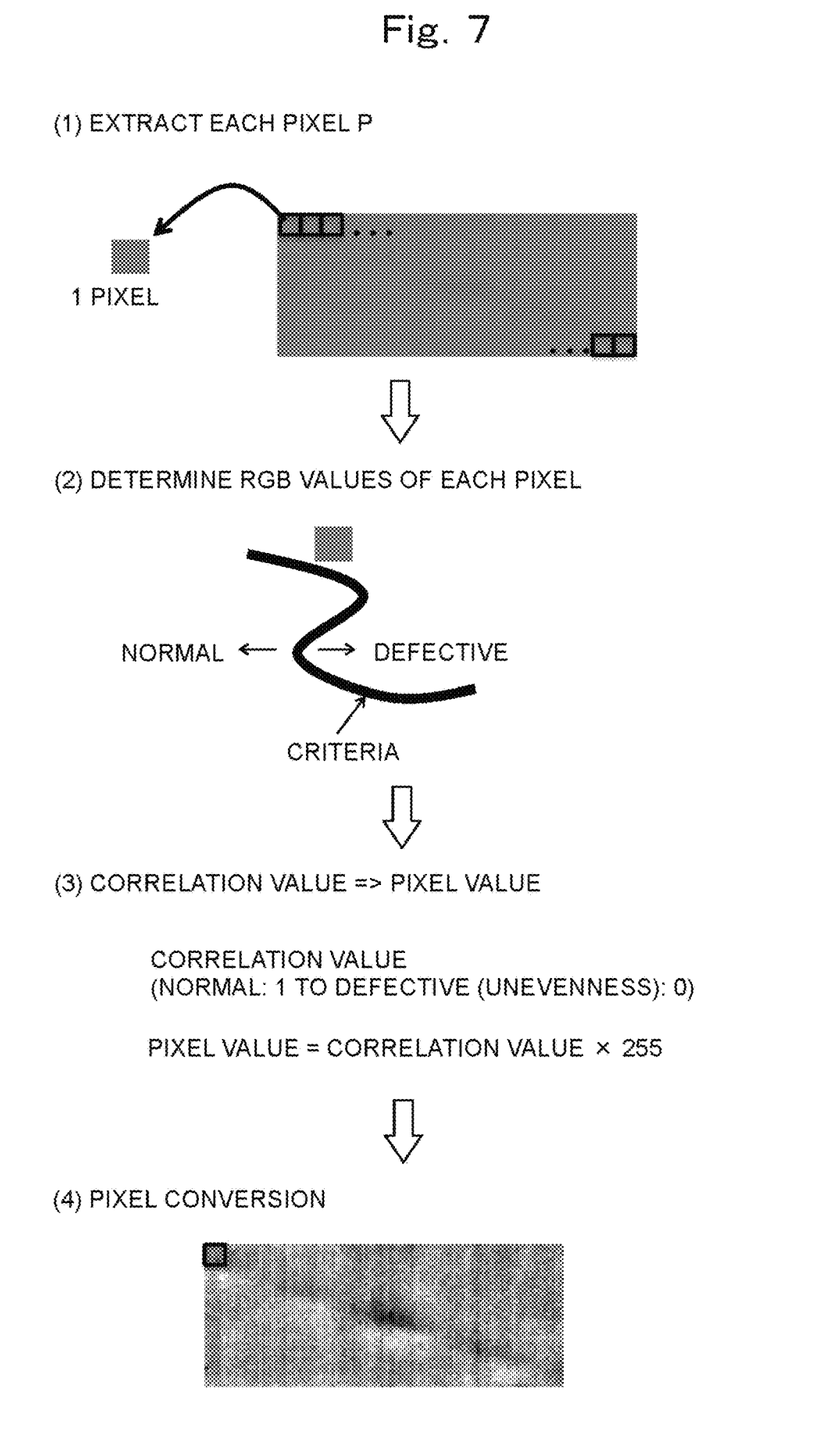
FIG. 7 is a schematic view schematically showing a flow of inspection of the unknown image information for defects by filtering in this embodiment.

Specifically, for example, using the criteria T defined as shown in FIG. 4 above, the determination unit 30 can determine whether the inspection target, that is, each pixel P in the unknown image information DB is on the defect side or on the normal side, as shown in FIG. 6. More specifically, as shown in FIG. 7, the determination unit 30 extracts each pixel P from the image information D. Subsequently, the determination unit 30 expresses whether the RGB values of each pixel P are on the defect side or on the normal side with respect to the criteria T as numerical values (relative values) ranging from 0 to 1, with the normal side being 0 and the defect side being 1. Subsequently, the determination unit 30 expresses the obtained correlation values as pixel values of each pixel P by multiplying them by 255 and converts the pixel values of all the pixels P into an image.

The aforementioned description shows an embodiment in which the determination unit 30 defines the aforementioned criteria T based on the RGB values, but the determination unit 30 may be configured to define the aforementioned criteria T based further on HSL values in addition to the RGB values. That is, the determination unit 30 may be configured to define the aforementioned the criteria T based on the six-dimensional color information of the RGB values and the HSL values. The HSL values can be converted from the RGB values, for example, using a conventionally known formula such as the conversion formula shown in Formula 1 below.

Formula 1

Conversion from $RGB$ to $HLS$ $(HSL)$ $$H = \begin{cases} \text{undefined}, & \text{if MIN = MAX} \\ 60 \times \dfrac{G-R}{\text{MAX}-\text{MIN}} + 60, & \text{if MIN} = B \\ 60 \times \dfrac{B-G}{\text{MAX}-\text{MIN}} + 180, & \text{if MIN} = R \\ 60 \times \dfrac{R-B}{\text{MAX}-\text{MIN}} + 300, & \text{if MIN} = G \end{cases} \quad (1)$$

$$L = \frac{\text{MAX} + \text{MIN}}{2}$$

$$\text{Cylindrical model } S = \frac{\text{MAX} - \text{MIN}}{1 - |\text{MAX} + \text{MIN} - 1|}$$

Further, the determination unit 30 may be configured to define the aforementioned criteria T based on color information further including XYZ values in addition to the RGB values. That is, the determination unit 30 may be configured to define the aforementioned criteria T based on the six-dimensional color information of the RGB values and the XYZ values. Further, the determination unit 30 may be configured to define the aforementioned criteria T based on color information further including XYZ values in addition to the RGB values and the HSL values. That is, the determination unit 30 may be configured to define the aforementioned criteria T based on the nine-dimensional color information of the RGB values, the HSL values, and the XYZ values. The XYZ values can be converted from the RGB values, for example, using a conventionally known formula such as the conversion formula shown in Formula 2 below.

Formula 2

$$\begin{bmatrix} X \\ Y \\ Z \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R \\ G \\ B \end{bmatrix} \quad (2)$$

The determination unit 30 may be configured to determine the presence or absence of defects in each pixel by performing filtering based on the aforementioned RGB values and thereafter further filtering corresponding to the shape of defects. Examples of such filtering include differential filtering. As differential filtering, conventionally known differential filtering as shown in Formula 3 below can be used, for example.

Formula 3

$$\left( \begin{bmatrix} 1 & 2 & 1 \\ 0 & 0 & 0 \\ -1 & -2 & -1 \end{bmatrix} + \begin{bmatrix} -1 & 0 & 1 \\ -2 & 0 & 2 \\ -1 & 0 & 1 \end{bmatrix} \right) / 2 \quad (3)$$

The inspection method of this embodiment is a method for inspecting a sheet 50 for defects using the inspection apparatus 1 of this embodiment, the method including: capturing an image of the sheet 50 as image information D having color information including RGB values; and defining, for each pixel P, the presence or absence of defects in all pixels P of the image information D of the captured image so as to determine the presence or absence of defects in the sheet 50.

As described above, the inspection apparatus 1 of this embodiment configured to inspect a target (herein a sheet) 50 for defects includes: the image capturing unit 20 capable of capturing an image of the target 50 as the image information D having color information including the RGB values; and the determination unit 30 configured to determine the presence or absence of defects in the target 50 based on the color information of the image information D of the image captured by the image capturing unit 20, wherein the determination unit 30 is configured to define, for each pixel P, the criteria T for determining the presence or absence of defects in the pixel P of the image information D, based on the color information in the defect-free region R1 of the target 50, and filter all the pixels P in the image information D of the image captured by the image capturing unit 20 so as to determine the presence or absence of defects in each pixel P, based on the defined criteria T.

According to such a configuration, the determination unit 30 can define the criteria T for determining the presence or absence of defects in each pixel P of the image information D using the RGB values per unit of pixel P and can determine the presence or absence of defects in each of all the pixels P based on the defined criteria T. Therefore, defect inspection can be performed with higher accuracy than in the case of defining the criteria T without using the RGB values of a plurality of pixels P as a whole. Therefore, the inspection method of this embodiment allows defect inspection to be performed with higher accuracy than in conventional techniques.

In the inspection apparatus 1 of this embodiment, it is preferable that the color information further include HSL values.

According to such a configuration, the determination unit 30 can define the aforementioned criteria T further based on the HSL values in addition to the RGB values as the color information. Therefore, according to the inspection method of this embodiment, the aforementioned criteria T can be defined more in detail, and the accuracy of the aforementioned criteria T is further enhanced, as a result of which defect inspection can be performed with higher accuracy.

In the inspection apparatus 1 of this embodiment, it is preferable that the color information further include XYZ values.

According to such a configuration, the determination unit 30 can define the aforementioned criteria T further based on XYZ values in addition to the RGB values as the color information or further based on XYZ values in addition to the RGB values and the HSL values as the color information. Therefore, according to the inspection method of this embodiment, the aforementioned criteria T can be defined more in detail, and the accuracy of the aforementioned criteria T is further enhanced, as a result of which defect inspection can be performed with higher accuracy.

In the inspection apparatus 1 of this embodiment, it is preferable that the determination unit 30 be configured to filter each pixel P based on the color information in the defect-free region R1 of the target 50 and further the color information in the defect-containing region R2 thereof.

According to such a configuration, the determination unit 30 can define the aforementioned criteria T based on the color information in the defect-containing region R2 in addition to the color information in the defect-free region R1. Therefore, according to the inspection method of this embodiment, the aforementioned criteria T can be defined more in detail, and the accuracy of the aforementioned criteria T is further enhanced, as a result of which defect inspection can be performed with higher accuracy.

In the inspection apparatus 1 of this embodiment, it is preferable that the determination unit 30 be configured to define the criteria T using a support vector machine.

According to such a configuration, the aforementioned criteria T can be defined more accurately by using the support vector machine. Therefore, according to the inspection method of this embodiment, the aforementioned criteria T can be defined more in detail, and the accuracy of the aforementioned criteria T is further enhanced, as a result of which defect inspection can be performed with higher accuracy.

In the inspection apparatus 1 of this embodiment, it is preferable that the determination unit 30 be configured to perform the aforementioned filtering and thereafter further filtering corresponding to the shape of defects.

According to such a configuration, the defects can be more emphasized by performing the aforementioned filtering and thereafter further filtering corresponding to the shape of defects, and therefore defect inspection can be performed with higher accuracy.

In the inspection apparatus of this embodiment, it is preferable that the determination unit 30 be configured to map the results of determination of the presence or absence of defects in each of all pixels P in the image information D of the image captured by the image capturing unit 20.

According to such a configuration, the presence or absence of defects can be easily checked by mapping the results of determination for all the pixels P.

The inspection method of this embodiment is a method for inspecting a target 50 for defects using the inspection apparatus 1, the method including: capturing an image of the target 50 as image information D including color information; and determining the presence or absence of defects in each of all pixels P in the image information D of the captured image so as to determine the presence or absence of defects in the target 50.

According to such a configuration, defect inspection can be performed with higher accuracy than in conventional techniques by using the aforementioned inspection apparatus 1.

As has been described above, the present embodiments provide an inspection apparatus and an inspection method which are capable of performing defect inspection with higher accuracy than in conventional techniques.

The inspection apparatus and the inspection method of this embodiment are as described above, but the present invention is not limited to the aforementioned embodiments, and the designs can be modified appropriately. For example, in the aforementioned embodiments, each pixel P of the image information D is filtered using color information based on the image information D in the defect-free region R1 and the defect-containing region R2, but each pixel P of the image information D may be filtered in the present invention using color information based on the image information D only in the defect-free region R1. In such a case, the relationships between the obtained color information groups and the result groups for defect determination are linear, and therefore the criteria T may be defined by using a linear classifier as the aforementioned classifier instead of the support vector machine.

EXAMPLES

Hereinafter, the present invention will be described more in detail with reference to examples, but the present invention is not limited to these examples.

Using the inspection apparatus 1 provided with the image capturing unit 20 and the irradiation unit 10 and shown in FIG. 1, the angle θ1 was set to 10°, the distance between the image capturing unit (lens) and the sheet 50 was set to 590 mm, and the distance between the irradiation unit 10 and the sheet 50 was set to 70 mm. As the sheet 50 serving as a target, PENJEREX (manufactured by NITTO DENKO CORPORATION) known as containing defects in advance was used.

Image Capturing Unit 20

Camera, LQ-201CL-F, manufactured by JAI Ltd., RGB+IR (4D camera), resolution (0.1 mm/pix), and visual field 340 mm/unit Lens, BL-L1050-F, manufactured by Bluevision Ltd., multi-plate (auto-focus shift function)

Irradiation Unit 10

White LED, LNSP-SW, manufactured by CCS Inc.

Figure 8:
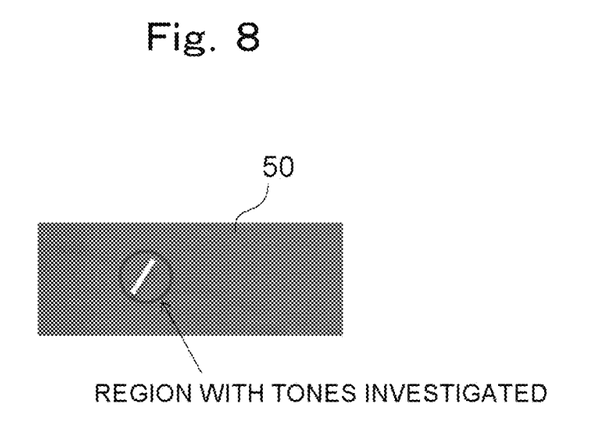
FIG. 8 is an image obtained by capturing an image of a sheet used in Examples.

Light was emitted from the irradiation unit 10 to the sheet 50, and an image of the sheet 50 was captured by the image capturing unit 20 so as to include a defect. FIG. 8 shows the captured image (image before filtering). The image information D shown by the image in FIG. 8 was filtered as described below, and tones in the region shown by a solid line in FIG. 8 were investigated as described below.

Comparative Example 1

Figure 9:
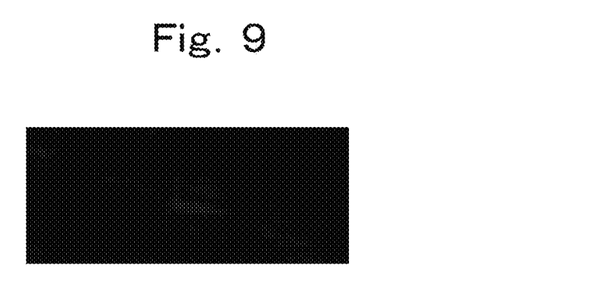
FIG. 9 is an image showing a mapped image of Comparative Example 1.
Figure 10:
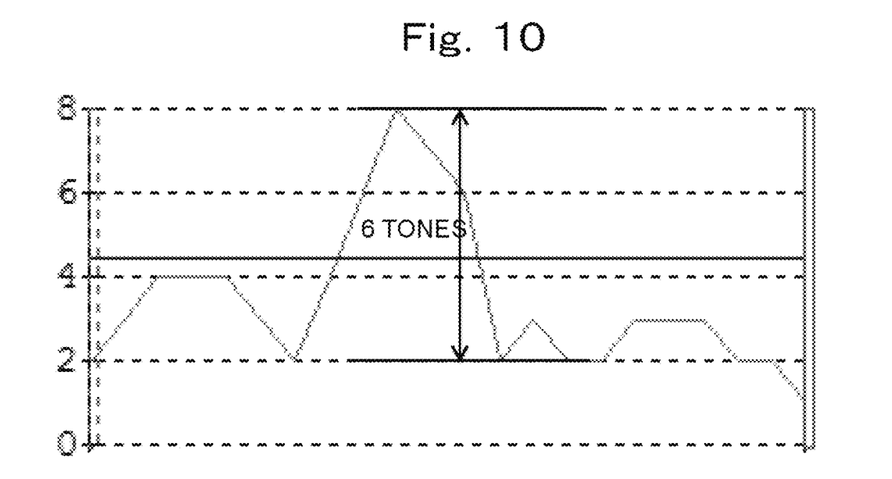
FIG. 10 is a graph showing a tone in a region of Comparative Example 1.

It turned out from preliminary experiments that, of the RGB values of the image information in the defective part of the sheet 50 used, the B value was more significantly detected (captured) than the R value and the G value. Then, the color information of the B value was extracted from the RGB values of the obtained image information D, and the B value of all the extracted pixels was subjected to differential filtering shown in formula 3 above, so that the defective part was emphasized and imaged. As a result, an image as shown in FIG. 9 was obtained. In the part shown by a solid line in FIG. 8, there were 6 tones in the difference between the part with the darkest color and the part with the lightest color as shown in FIG. 10.

Example 1

Figure 11:
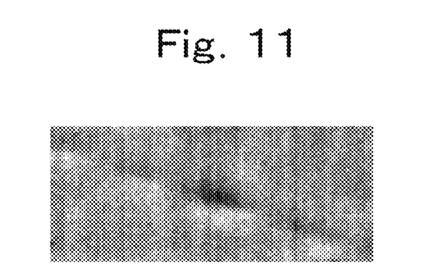
FIG. 11 is an image showing a mapped image of Example 1.
Figure 12:
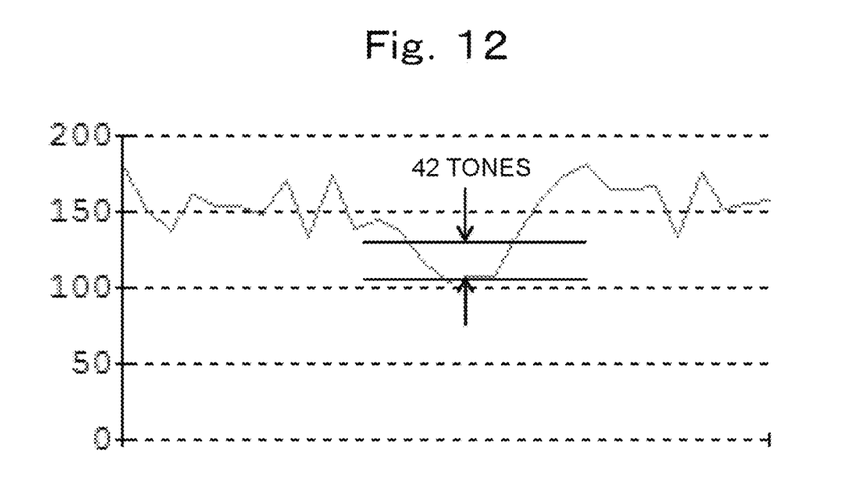
FIG. 12 is a graph showing a tone in a region of Example 1.

The criteria T for determining the presence or absence of defects were defined by the determination unit 30 using a support vector machine, based on the RGB value group of each pixel P of the obtained image information D, the defective result group, and the non-defective result group. Using the defined criteria T, unknown image information D (unknown about the presence or absence of defects) as an inspection target was filtered to determine the presence or absence of defects for each pixel P and was mapped by multiplying the numerical values (relative values within the range from 0 to 1) obtained by the filtering by 255. As a result, an image as shown in FIG. 11 was obtained. In the part shown by a solid line in FIG. 8, there were 42 tones in the difference between the part with the darkest color and the part with the lightest color as shown in FIG. 12.

Example 2

Figure 13:
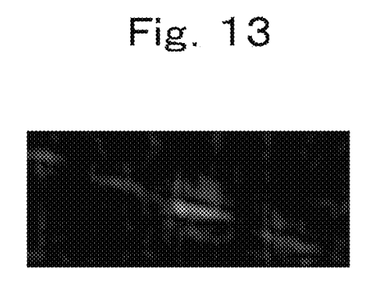
FIG. 13 is an image showing a mapped image of Example 2.
Figure 14:
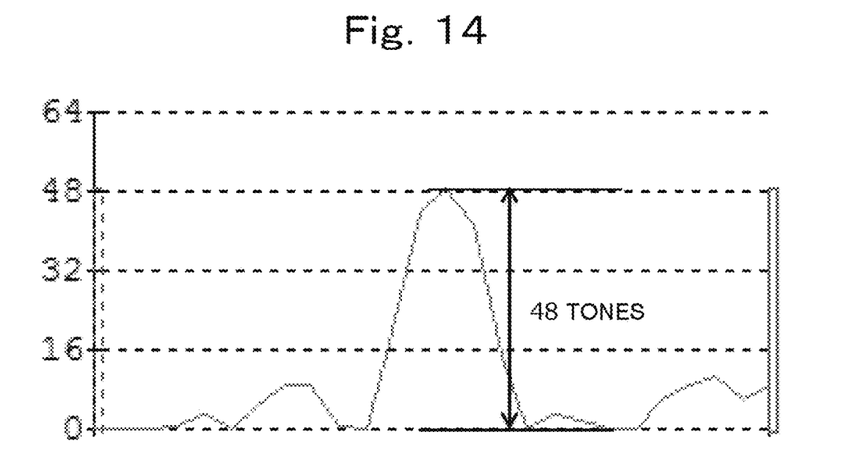
FIG. 14 is a graph showing a tone in a region of Example 2.

The image obtained in Example 1 and shown in FIG. 11 was further filtered by the differential filtering shown in formula 3 above. As a result, the defective part could be emphasized as shown in FIG. 13. In the part shown by a solid line in FIG. 8, there were 48 tones in the difference between the part with the darkest color and the part with the lightest color as shown in FIG. 14.

Example 3

Figure 15:
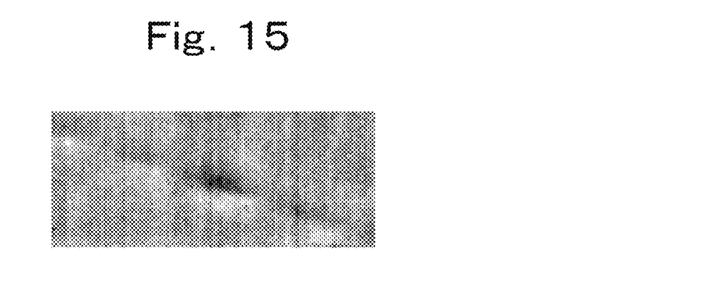
FIG. 15 is an image showing a mapped image of Example 3.

The criteria T for defect determination were defined by the determination unit 30 using a support vector machine, based on the RGB value, HSL value, and XYZ value groups of each pixel P of the obtained image information D, the defective result groups, and the non-defective result groups. Using the defined criteria T, unknown image information D (unknown about the presence or absence of defects) as an inspection target was filtered to determine the presence or absence of defects in each pixel P and was mapped by multiplying the numerical values (relative values within the range from 0 to 1) obtained by the filtering by 255. As a result, an image as shown in FIG. 15 was obtained. In the part shown by a solid line in FIG. 8, as a result of multiplying the numerical values obtained by the aforementioned process by 255, there were 45 tones in the difference between the part with the darkest color and the part with the lightest color as shown in FIG. 16.

Example 4

Figure 16:
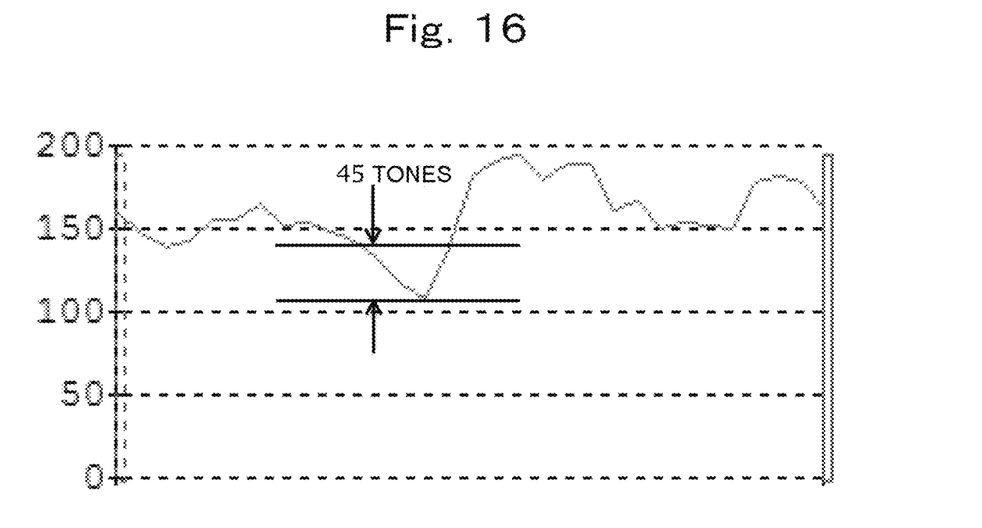
FIG. 16 is a graph showing a tone in a region of Example 3.
Figure 17:
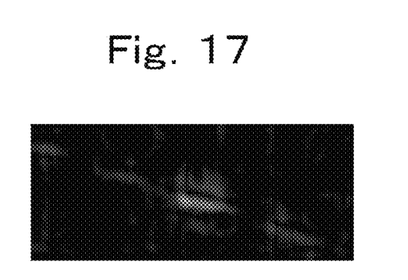
FIG. 17 is an image showing a mapped image of Example 4.
Figure 18:
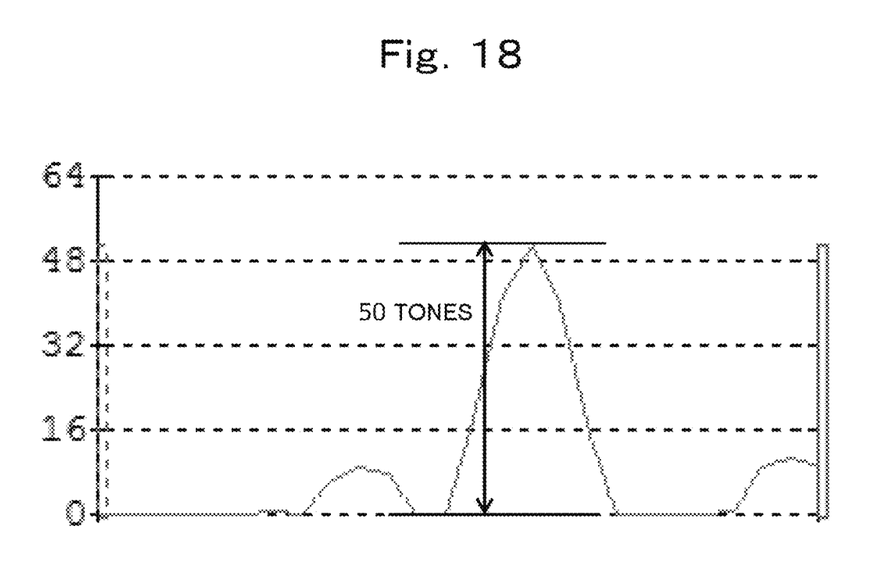
FIG. 18 is a graph showing a tone in a region of Example 4.

The image obtained in Example 3 and shown in FIG. 16 was further filtered by the differential filtering shown in formula 3 above. As a result, defective part could be emphasized, as shown in FIG. 17. In the part shown by a solid line in FIG. 8, there were 50 tones in the difference between the part with the darkest color and the part with the lightest color as shown in FIG. 18.

From the aforementioned results, it was understood that defect inspection with better accuracy than in conventional techniques can be achieved by defining the criteria T using the RGB values of each pixel P. Further, it was understood that defect inspection with better accuracy can be achieved by defining the criteria T using the RGB values, HSL values, and XYZ values of each pixel P than when using the RGB values.

Embodiments and Examples of the present invention have been described as above, but it is intended to appropriately combine the features of Embodiments and Examples from the beginning. Further, Embodiments and Examples disclosed herein should be regarded as illustrative and not restrictive in all respects. It is herein intended that the present invention is not limited to Embodiments and Examples described above, is represented by the claims, and encompasses all modifications within the meaning and the scope equivalent to the claims.

REFERENCE SIGNS LIST

1: Inspection apparatus
10: Irradiation unit
20: Image capturing unit
30: Determination unit
40: Display unit
50: Sheet (target)

What is claimed is:

1. An inspection apparatus configured to inspect a target for defects, comprising:
    a camera capturing an image of the target as image information having color information including RGB values; and
    a computer configured to determine presence or absence of defects in the target based on the color information of the image information of the image captured by the camera, wherein the computer uses a support vector machine to create defined criteria for each pixel to determine the presence or absence of defects in each pixel of the image information of the target, the support vector machine being trained using each value group of R value, G value, and B value and a corresponding result group for defect determination of R value, G value, and B value of the color information of a training image having a defect-containing region to create boundaries respectively for R value, G value, and B value as the defined criteria, and the defined criteria being a non-linear relationship for each pixel between the color information in a defect-free region of the training image and the defect-containing region of the training image, and
    the computer filters all pixels in the image information of the target so as to determine the presence or absence of defects in each pixel, based on the defined criteria.

2. The inspection apparatus according to claim 1, wherein the color information further includes HSL values.

3. The inspection apparatus according to claim 1, wherein the color information further includes XYZ values.

4. The inspection apparatus according to claim 1, wherein the computer is configured to map results of determining the presence or absence of defects in each of all pixels in image information of the image captured by the camera.

5. A method for inspecting a target for defects, comprising:
    capturing an image of the target as image information having color information including RGB values;
    creating, using a support vector machine, boundaries for R value, G value, and B value as defined criteria for each pixel to determine a presence or absence of defects in each pixel of the image information of the target, by training the support vector machine using each value group of R value, G value, and B value and a corresponding result group for defect determination of R value, G value, and B value of the color information of a training image which includes a defect-containing region, the defined criteria being a non-linear relationship for each pixel between the color information in a defect-free region of the training image and the defect-containing region of the training image; and
    determining the presence or absence of defects in each of all pixels in the image information of the target so as to determine presence or absence of defects in the target.

* * * * *